(12) United States Patent
Hansen et al.

(10) Patent No.: US 8,636,254 B2
(45) Date of Patent: Jan. 28, 2014

(54) DYNAMICALLY CONTROLLED CROSS FLOW INSTABILITY INHIBITING ASSEMBLY

(75) Inventors: Craig M. Hansen, Colleyville, TX (US); Paul D. McClure, Fort Worth, TX (US); Sergey Macheret, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 446 days.

(21) Appl. No.: 12/893,618

(22) Filed: Sep. 29, 2010

(65) Prior Publication Data

US 2012/0074263 A1    Mar. 29, 2012

(51) Int. Cl.
*B64C 23/00*    (2006.01)

(52) U.S. Cl.
USPC .......................................................... 244/205

(58) Field of Classification Search
USPC ........... 244/198, 199.1, 201, 204, 204.1, 205, 244/1 A, 133
See application file for complete search history.

(56) References Cited

U.S. PATENT DOCUMENTS

| | | | |
|---|---|---|---|
| 3,095,163 A * | 6/1963 | Hill | 244/12.1 |
| 4,796,153 A * | 1/1989 | Amason et al. | 361/218 |
| 6,570,333 B1 | 5/2003 | Miller et al. | |
| 6,796,532 B2 | 9/2004 | Malmuth et al. | |
| 6,805,325 B1 | 10/2004 | Malmuth et al. | |
| 7,017,863 B2 | 3/2006 | Scott et al. | |
| 7,066,431 B2 | 6/2006 | Scott et al. | |
| 7,380,756 B1 | 6/2008 | Enloe et al. | |
| 7,624,941 B1 | 12/2009 | Patel et al. | |
| 7,735,910 B2 * | 6/2010 | Ramsay | 296/217 |
| 7,988,101 B2 * | 8/2011 | Osborne et al. | 244/205 |
| 8,251,318 B2 * | 8/2012 | Khozikov et al. | 244/205 |
| 2004/0195462 A1 * | 10/2004 | Malmuth et al. | 244/205 |
| 2008/0023589 A1 | 1/2008 | Miles et al. | |
| 2009/0109115 A1 | 4/2009 | Dittrich et al. | |
| 2009/0173837 A1 | 7/2009 | Silkey et al. | |
| 2009/0212164 A1 | 8/2009 | Osborne et al. | |
| 2010/0133386 A1 * | 6/2010 | Schwimley et al. | 244/205 |
| 2012/0074263 A1 * | 3/2012 | Hansen et al. | 244/205 |

* cited by examiner

*Primary Examiner* — Joseph W Sanderson
(74) *Attorney, Agent, or Firm* — Reising Ethington P.C.

(57) ABSTRACT

A cross flow instability inhibiting assembly generates periodic aerodynamic disturbances on a swept wing. The cross flow instability inhibiting assembly is dynamic in that it can be selectively turned on and off as needed. The cross flow instability inhibiting assembly is a strip of material separating a set of electrodes from a set of electrodes. When energized, the fields created between the electrodes and electrodes create plasma disturbances around the electrodes. The electric fields and plasma create heating and body force disturbances on the air or surrounding fluid. These plasma generated disturbances disrupt development of unstable voriticity due to cross flow, inhibiting transition to turbulent flow of the wing to which it is attached. The electrodes may be connected to electrical power in series or they may be connected to an alternating configuration. The system allows for various uses based on the design of the wing and the conditions in which the host aircraft is flying.

16 Claims, 3 Drawing Sheets

DYNAMICALLY CONTROLLED CROSS FLOW INSTABILITY INHIBITING ASSEMBLY

CROSS-REFERENCES TO RELATED APPLICATIONS

Not Applicable.

STATEMENT REGARDING FEDERALLY SPONSORED RESEARCH OR DEVELOPMENT

Not applicable.

BACKGROUND ART

1. Field of the Invention

The invention generally relates to performance features of a wing of an aircraft. More particularly, the invention relates to a structure for inhibiting cross flow instabilities from reducing the performance of a wing or other aerodynamic surfaces of an aircraft.

2. Description of the Related Art

Over the years, wing design has changed dramatically. Wing leading edges are swept to allow higher speeds without suffering large drag increases. Wings and tails are also swept to control the aerodynamic center and balance of an aircraft. Other issues including integration of sensors also drive the wing designer to sweep the wing leading edge back.

An important issue to the design of the swept wing is cross flow instabilities. Cross flow is the flow of air along the wingspan, from the root towards the tip, as opposed to over or under the wing, as it is designed to travel across a wing. Cross flow is not parallel to the primary air flow direction (the direction of travel of an aircraft), but flows outwardly, towards the wing tips when the wing is swept back. Cross flow occurs very close to the wing surface in an area referred to as the boundary layer. The air in the boundary layer is heavily influenced by the effects of viscosity and the 'no-slip' condition at the surface of the wing. These effects retard the flow of air over the wing and create a "viscous" drag on the wing. The airflow outside the boundary layer (further from the wing surface) is only minimally influenced by the effects of viscosity.

On swept wings, cross flow occurs primarily in the boundary layer, but does not occur to the same magnitude in the inviscid region outside the boundary layer. There is a continuous rapid change in the direction of the flow inside the boundary layer with the maximum cross flow occurring just off the surface and reduced cross flow as the distance from the surface is increased. This change in the direction of the airflow with distance normal to the surface creates vorticity that is amplified downstream and causes the flow in the boundary layer to transition from laminar to turbulent. This transition is marked by a change in the flow character and the drag. The laminar boundary layer is ordered, and minimal mixing occurs between layers (lamina). A turbulent boundary layer is marked by turbulent mixing that disrupts the previous laminar flow. The turbulent mixing causes an increased rate of exchange of momentum between the higher velocity flow further from the surface and the lower velocity flow closer to the surface. This increased exchange of momentum creates larger velocities closer to the surface and this leads to higher 'friction drag' at the surface. The friction drag of a laminar boundary layer can be about half of the friction drag of a turbulent boundary layer and for a typical all wing subsonic aircraft, this results in about 25% lower total drag and 25% lower fuel consumption. The benefits are smaller if laminar flow is achieved only on the wings and the aircraft consist of a wing and fuselage.

To minimize the occurrences in which cross flow instabilities are amplified and cause transition from laminar to turbulent flow, Distributed Roughness Elements (DRE) have been designed into wings. DREs are physical "bumps" added to or designed into a surface of a wing. The physical bumps create a disturbance in the flow field that prevents cross flow instabilities from growing and causing the transition from laminar flow to turbulent flow boundary layer conditions. The bumps create periodic vorticity at a scale that is well damped downstream. This vorticity inhibits the formation of larger scale vorticity that is not damped and would grow and eventually cause the flow to transition from laminar to turbulent. In the past, these DREs have either been fixed geometric bumps in the wing surface or pneumatically powered flexible bumps. Both of these two solutions have their deficiencies. With regard to the fixed physical DREs, there is no control in the magnitude, spacing or disturbance location as these are fixed in place and made during the manufacturer of the wing or applied as an appliqué before flight. The pneumatically controlled DREs are complex, require a fluid source (air or the like), and offer limited control. The shape of pneumatic bumps is typically far from ideal also as the bumps tend to be smooth while sharper disturbances create more voracity.

SUMMARY OF THE INVENTION

A cross flow instability inhibiting assembly generates periodic disturbances on a swept wing. The cross flow instability inhibiting assembly includes a base of dielectric material having an inner surface and an outer surface. A plurality of electrodes is fixedly secured to the inner surface. The plurality of electrodes is electrically connected to a source of electrical current. The cross flow instability inhibiting assembly also includes a plurality of electrodes fixedly secured to the outer surface. The plurality of electrodes generates a plasma and an aerodynamic disturbance area disposed above or adjacent to each of the plurality of electrodes. The plasma generated disturbances, arranged periodically on the surface, prevent and inhibit cross flow instabilities across the swept wing.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
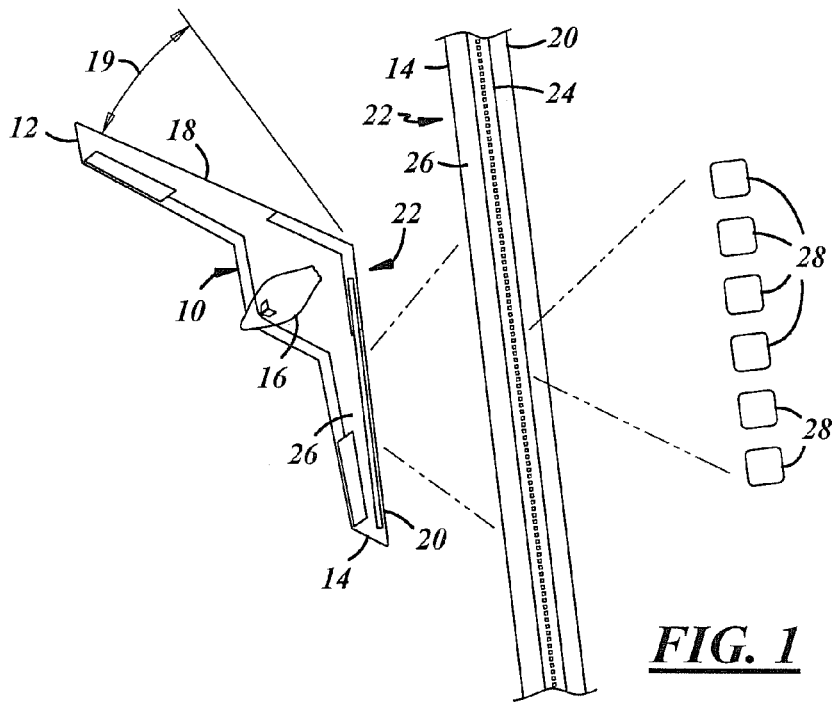
FIG. 1 is an exploded perspective view of one embodiment of the invention fixedly secured to a swept wing of an aircraft.

Referring to FIG. 1, an aircraft, generally shown at 10, includes a wing 12, 14. The aircraft 10 also includes a propulsion device 16, which is typically a jet engine. Because the aircraft 10 is designed to be unmanned, the aircraft 10 does not have a cockpit or a fuselage. It should be appreciated by those skilled in the art that the aircraft 10 can be a manned aircraft. Further, the means of propulsion need not be provided by a jet engine as a propeller driven by another type of engine (e.g., internal combustion engine), or a glider could incorporate the invention.

The wing 12, 14 defines a leading edge 18, 20. The leading edge 18, 20 divides the air through which the aircraft 10 is traveling so that a portion of the air goes over the swept wing 12, 14, and a portion of the air goes underneath the swept wing 12, 14. The wing 12, 14 is swept back from perpendicular to the airflow. Leading edge 18 is swept back through angle 19 from an unswept wing configuration. For purposes of simplicity, one embodiment of the invention, a cross flow instability inhibiting assembly, is generally indicated at 22 along the leading edge 20 of the swept wing 14. It should be appreciated by those skilled in the art that the invention 22 would also extend along the leading edge 18 of swept wing 12. While the invention 22 extends along almost the entire leading edge 20, the cross flow instability inhibiting assembly 22 may only extend along a portion or multiple portions of the leading edge 20. Determining the location(s) of where the cross flow instability inhibiting assembly 22 will be located is determined by the wing 12, 14 design and the portions of the wing 12, 14 that are designed to maintain laminar flow.

The cross flow instability inhibiting assembly 22 is shown in FIG. 1 to include a base 24 that is fixedly secured to an upper side 26 of the swept wing 14. It should be appreciated that the cross flow instability inhibiting assembly 22 may also be fixedly secured in an equal or differing configuration on the bottom side (not shown) of the swept wing 14 or on other aerodynamic surfaces. The cross flow instability inhibiting assembly 22 is creating a plurality of plasma squares 28, best shown on the far right side of FIG. 1. These plasma squares 28 have a height (shown best in FIG. 5) allowing the plasma square 28 to act as solid structures on the surface of the wing 14 such that it creates vorticity at a scale and spacing that is well damped and will dissipate downstream. This vorticity prevents the formation and growth of larger and more widely spaced vorticity that is unstable and leads to transition from laminar to turbulent flow. If the cross flow instability inhibiting assembly 22 is turned off, the plasma squares 28 will disappear and the base 24 will have an aerodynamically smooth surface. As such, the cross flow instability inhibiting assembly 22 would not have an effect on the air flow moving over the wings 12, 14 because the plasma would not be created by the cross flow instability inhibiting assembly 22. This would lead to streamwise vorticity growth and transition from laminar to turbulent conditions. It should be appreciated by those skilled in the art that although FIG. 1 shows a single array of plasma squares 28, these plasma squares 28 could be replaced by plasmas in any number of shape configurations, as will be discussed in greater detail below. Further, the array of plasma squares 28 could be replaced with a two-dimensional array of multiple rows in columns as is deemed appropriate based on the design of the swept wing 12, 14. In addition, the two dimensional arrays that may be created may have the plasma squares 28 offset from each other from row to row depending on the design parameters of the swept wing 12, 14. These rows could be powered individually or in groups depending on the location of conducting paths and switches on the lower surface and the desired disturbance spacing and location for a given flight condition.

Figure 2:
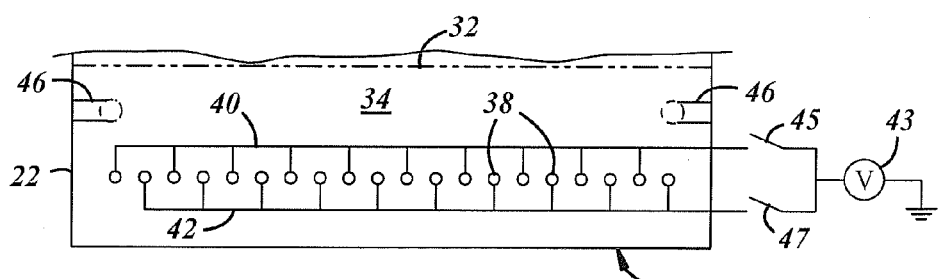
FIG. 2 is a bottom view of one device incorporating the invention as it is attached to a sheet of devices shown partially cutaway.
Figure 3:
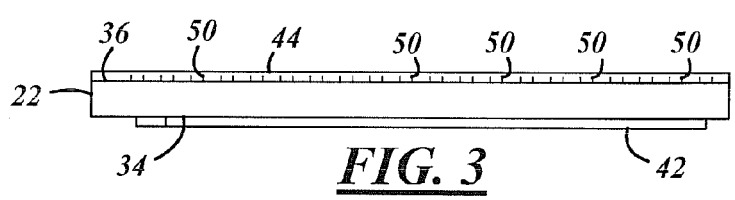
FIG. 3 is an end view of FIG. 2.

Referring to FIG. 2, a sheet of cross flow instability inhibiting assemblies 22 is generally shown at 30. The cross flow instability inhibiting assemblies 22 are formed in a single sheet and then severed from each other along etching lines 32 (example shown in FIG. 2). FIG. 2 represents an underside of the sheet 30 wherein the cross flow instability inhibiting assemblies 22 are viewed from their inner surfaces. The inner surface 34 of the cross flow instability inhibiting assembly 22 abuts the wing 14 when secured thereto. The base 24 of the cross flow instability inhibiting assembly 22 is made of a dielectric material having an inner surface 34 (shown in FIG. 2) and an outer surface 36 (best seen in FIGS. 3 and 4). As is typical with a substrate, the inner 34 and outer 36 surfaces are parallel to each other. The dielectric material is typically flexible and therefore can conform to the wing shape.

Figure 4:
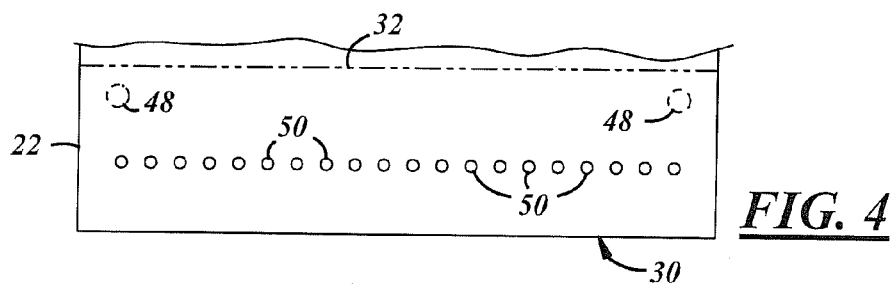
FIG. 4 is a top view of the device of FIG. 2 incorporating the invention as it is attached to a sheet of devices shown partially cutaway.

Returning attention to FIG. 2, the lower surface consists of a series of shaped electrodes, in this case circles 38, connected by conducting paths 40, 42. One polarity of the AC power supply is attached to one end of the series of circles 38 creating one line of electrically connected electrodes 38. A second channel from the power supply is connected to the electrically separate, second series of electrodes 42. The lower surface lines 40, 42 can be either the alternating potential (voltage) or the connection to ground, but there are several advantages of using the bottom lines 40, 42 as the alternating voltage. By having the voltage source connected to the bottom line 40, 42, the top electrode 44 is held at ground. This increases safety and reduces the likelihood of the upper surface voltage potential arcing to nearby conducting material. The circles 50, shown in FIG. 4, are regions where the conducting material of the top electrode 44 has been etched away. These circles 50 are directly above the conductor circles 38 on the lower surface 34 shown in FIG. 2. While not shown in these Figures, the conductor circles 38 and the circles 50 may not have equal areas. In fact, they may not have the same shapes (e.g., one may be an oval and the other may be a circle). It is, however, important that at least a portion of each of the conductors 38 be coaxial with each of the etched areas 50.

The use of alternating electrodes 38 being serially connected is an example of how the plurality of electrodes 38 may be subdivided and controlled independently of each other in various configurations through switches, graphically represented at 45, 47. While only one voltage source 43 and set of switches 45, 47 are shown to be electrically connected to the lead lines 40, 42, it should be appreciated that these all lead lines 40, 42 will be connected to similar voltage sources and switching mechanisms when installed on a wing.

Figure 6:
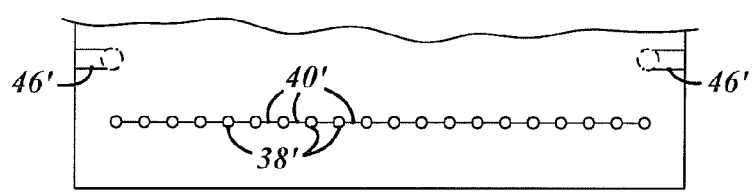
FIG. 6 is a bottom view of a device having an alternative embodiment of the invention as it is attached to a sheet of devices shown partially cutaway.

As an alternative to the embodiment shown in FIG. 2, wherein like prime numerals represent similar structures, the plurality of electrodes 38' are connected together by a single, continuous lead line 40' only in FIG. 6. In this particular example, the plurality of electrodes 38' are not designed to operate independently of any of the other plurality of electrodes 38' and all will be turned on and off together in unison.

FIG. 4 represents the outer surface 36 of the cross flow instability inhibiting assembly 22. In a preferred embodiment, a ground layer 44 covers the entire outer surface 36. The ground layer 44 is a material suitable for conducting a current. In the preferred embodiment, the ground layer 44 is a layer of copper sufficiently thick to easily carry the necessary currents. Nickel and gold plating are preferred to prevent or minimize oxidation of the copper. The ground layer 44 is the entire upper surface except for the holes 50 (or other shapes) where the conductor is etched away only down to the upper surface of the dielectric and not through the dielectric. A hole 48 that extends completely through assembly 22 provides a means to electrically connect the upper surface 44 to a ground pad on the bottom side. This allows a completely smooth upper surface. A hole 48 is lined with copper, nickel and gold in the preferred embodiment and, therefore, electrically connects the entire upper surface with the pad 46 on the lower surface, best shown in FIG. 5. As an alternative to utilizing the hole 48, an electrically conducting strap (not shown) may be used to provide the conducting path around the cross flow instability inhibiting assembly 22.

Figure 5:
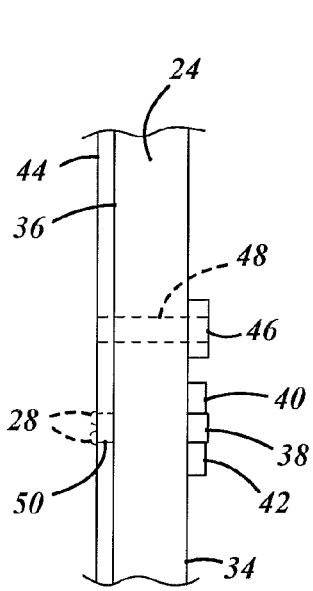
FIG. 5 is a side view of FIG. 4.

Disposed within the ground layer 44 is a plurality of etched away regions 50. The shapes of the regions 50 are exposed dielectric material and are aligned with the lower surface electrodes 38. More specifically, the regions 50 and electrodes 38 are paired in a manner such that each pair is coaxial. This is best seen in FIG. 5. The plurality of exposed dielectric regions 50 and the plurality of electrodes 38 are separated physically by the base 24 of dielectric material. The base 24 may be pliable or rigid. In one embodiment, the base is fabricated from Teflon.

Figure 7:
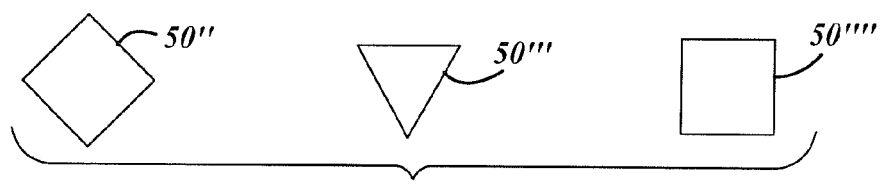
FIG. 7 is a collection of exemplary cross sections of the electrodes.

Referring to FIG. 7, cross sections of three different embodiments of a region 50 are shown with similar reference numerals multiply primed. Depending on the design of the wing 14 and the characteristics of the air flowing thereby, a particular shape for a region 50, 50', 50", 50''' may be determined to be more effective at inhibiting cross flow than another. In that situation, a particular region cross section would be selected. It is conceivable that a single cross flow instability inhibiting assembly 22 may include regions 50 having multiple cross sectional configurations or shapes, wherein these regions 50 in varying shapes would be alternated or segregated in particular segments based on the requirements of the wing hosting the cross flow instability inhibiting assembly 22. It should be appreciated by those skilled in the art that the set of example region cross sections 50', 50", 50''' are not intended to be limiting as other cross-sectional shapes could be employed as well. The upper surface shaped dielectric regions 50 are expected to be matched by the shape of the lower surface electrodes 38 though, as stated above, this is not a requirement. In addition, there may be advantages to increasing or decreasing the size of the lower surface electrode relative to the upper surface dielectric region to create larger or smaller disturbances on the upper surface of the wing. Also, offsets to the coaxial alignment of the upper surface exposed dielectric material and the lower surface electrode may be desirable to optimize the voracity disturbance created by the device.

Figure 8:
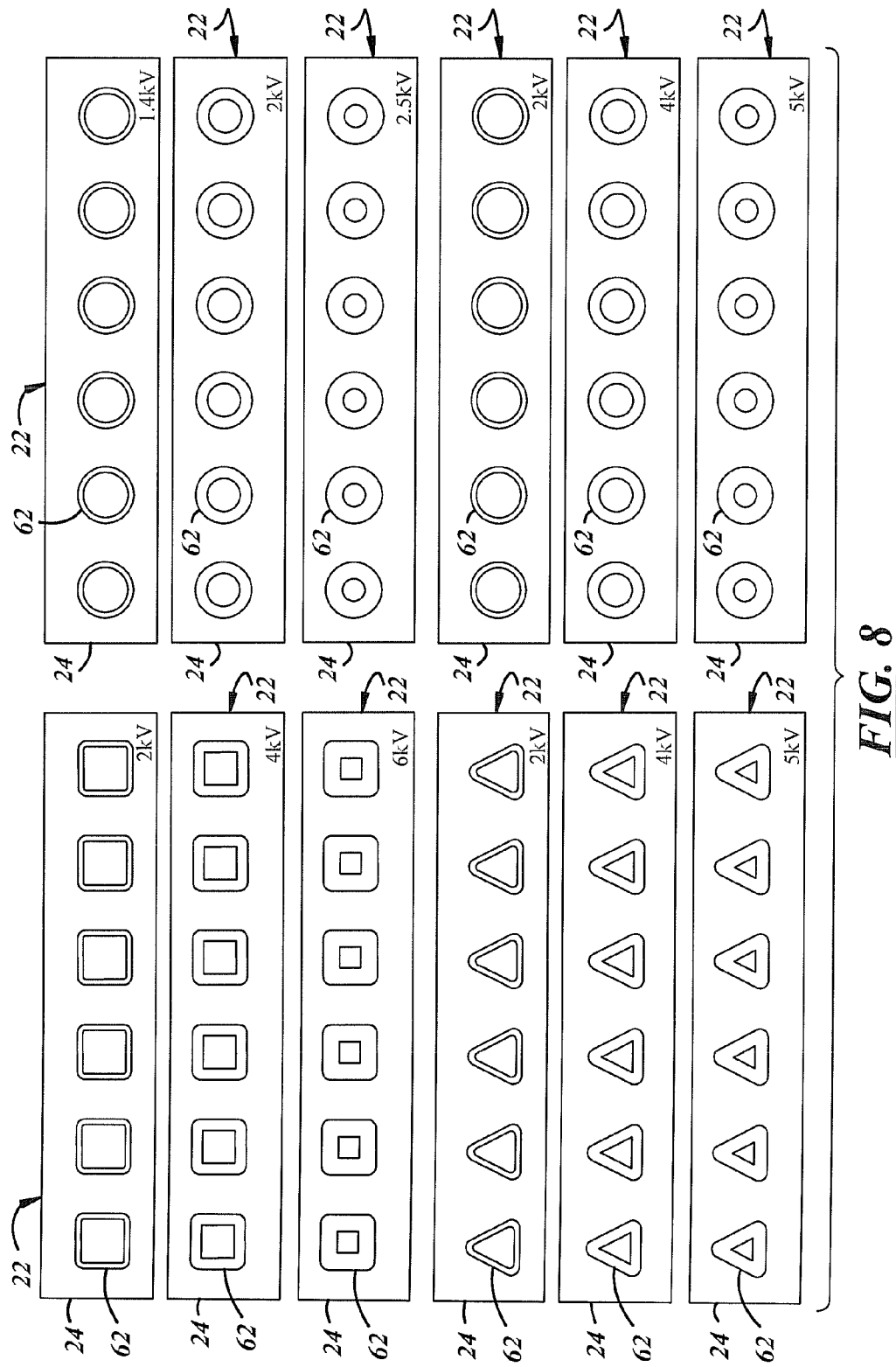
FIG. 8 is a collection of plasmas created by variously shaped electrodes under various levels of voltage application.

Referring to FIG. 8, multiple examples of cross flow instability inhibiting assemblies are shown. In the upper left hand corner, the regions 50 are squares. In the lower left hand corner, the regions are triangles. The dielectric layer 24 on the left hand side is 10 mils (0.010"). The right side of FIG. 8 represents plasmas created by regions that are circles. The upper right hand corner represents a dielectric layer 24 having a thickness of 5 mils (0.005"), whereas the lower right hand corner shows a dielectric layer 24 having a thickness of 10 mils (0.010"). Three examples for each of the various cross flow instability inhibiting assemblies 22 are shown representing three different levels of voltage being applied to the plurality of electrodes 38. FIG. 8 represents the fact that the plasmas 62 generated by the cross flow instability inhibiting assembly 22 is enhanced with increased voltage. It is also determined that the plasmas 62 may be created through different thicknesses of the dielectric by managing the voltage applied across the electrodes 38. As is shown in the right side of FIG. 8, the same plasmas 62 may be generated over a large range of thicknesses of the dielectric layer 24 by varying the voltage between the top and bottom surfaces.

It has been determined through study that the wing 12, 14 works best when the cross flow instability inhibiting assembly 22 is otherwise smooth. Therefore, each of the plurality of regions 50 is filled with a non-conductive material 60. The non-conductive material 60 does not affect the electrical fields created in the regions 50, but merely prevents air flow disturbances from being created in the space defined thereby. The etching away of the conductor to create this region 50 leaves a 'divot' typically between 5 and 50 microns. For many applications, this divot is large enough to create voracity that could cause premature transition to turbulent flow. The turbulence created by the divot may mimic or offset the effect of the plasma being created at the same location. In the preferred embodiment, the divots are filled after the device is constructed. Various dielectric materials can be used and light sanding of the device outer surface ensures a smooth final surface.

Figure 9:
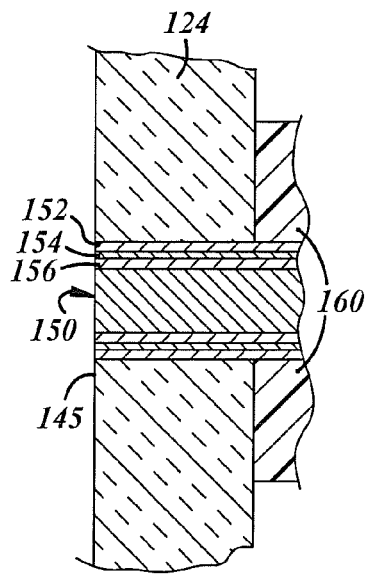
FIG. 9 is a first alternate embodiment wherein the 'divots' of the prior embodiment are filled with dielectric and a 'ring' of conductor(s) line the divot and provide a 'ring' upper electrode.

Turning attention to FIG. 9, the top layer of an alternate embodiment is shown that provides a perfectly smooth outer surface 145 and 'ring' electrodes 152, 154, 156 on the surface. These ring electrodes 152, 154, 156 form a tube or cylinder having a single side wall circumscribing the region 150. It should be appreciated by those skilled in the art that any number of ring electrodes 152, 154, 156 may be designed into the invention to form the tube side wall. Further, with the cross sections of FIG. 7, it should be appreciated that the tube may have a non-circular cross section resulting in more than one side wall required to complete the tube (replacing the cylinder). Like elements similar to those discussed in prior embodiments have reference numbers offset from prior embodiments by 100. In FIG. 9, a cross section of the dielectric layer 124 is shown. The dielectric layer 124 defines the regions 150 therein. In this embodiment, each region 150 includes three concentric layers 152, 154, 156. These layers are fabricated from different conductive materials. A non-exhaustive list of conductive materials that may be used to create the conductive layers 152, 154, 156 include, but are not limited to, gold, nickel and copper. Any number of conductive layers 152, 154, 156 may be used. In one embodiment, it is contemplated that a single conductive layer 152 would be all that is necessary. It is the conductive layer 152 (or conductive layers 152, 154, 156) that is affected by the current passing through the pads 160 to create a plasma disposed immediately adjacent to conducting layers 152, 154, 156, and above dielectric material 150. Outer surface 145 is now a dielectric material and the ground potential is only present in the ring electrodes 152, 154, 156. This is substantially different than the previous embodiment arrangement in which the top surface 44 is conducting material and divot 50 was constructed by removal of the conducting material. The top layer of this alternate embodiment is constructed to leave a perfectly smooth outer surface. This is accomplished by starting with dielectric material that is coated with a conductor on one side. The lower portion of the upper surface is coated with conductor and is etched to leave conducting paths and pads 160. Holes are drilled at the location 150, centered above pads 160. The center of the hole is plated with conductors 152, 154, and 156. Finally, a liquid dielectric material is squeezed into the holes 150 and not allowed to escape or run over the upper surface. Once the dielectric material is cured, this top layer is complete and can be assembled with the other layers to be described in FIG. 10. An example dielectric material that could be squeezed into hole 150 is 'pre-preg'.

Figure 10:
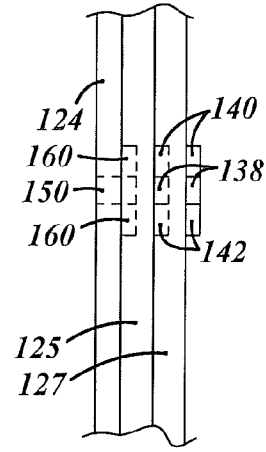
FIG. 10 is a second alternate embodiment wherein the divot is filled as in FIG. 9 and multiple layers of dielectric are used to provide alternate conduction paths to the lower electrode.

FIG. 10 shows the assembly of the top layer shown in FIG. 5 with multiple dielectric layers for this alternate embodiment. Each dielectric layer, 125 and 127 provides lower surface electrodes 138 and conducting paths 140, 142, to those electrodes. These dielectric layers are sandwiched together with the top layer described in FIG. 9. Each dielectric layer 125 or 127 that is added to the sandwich provides at least two new paths to lower surface electrodes 138 and provides additional control of plasma disturbance spacing. The multiple dielectric layers 125, 127 provide a means for separating conducting lines (for example, lines 140 in different layers) physically from each other. While this configuration may be thicker, and in some cases, less flexible, the interference between conducting lines and electrodes 138 is greatly reduced. The electrodes 138 continue to be paired up with the regions 150 on a one-to-one basis. Additionally, the multiple dielectric layers 125, 127 allow for more complex control of individual plasma spots at regions 150 by providing additional paths to electrodes 138 and there could be more electrodes individually controlled or controlled in small groups. This provides greater control of the periodicity of the plasma generated disturbances. It is understood that additional layers could be added for additional control.

Referring to FIG. 8, multiple examples of cross flow instability inhibiting assemblies are shown for purposes of providing examples only. In the upper left hand corner, the regions 50 are squares. In the lower left hand corner, the regions are triangles. The dielectric layer 24 on the left hand side is 10 mils (0.010"). The right side of FIG. 8 represents plasmas created by regions that are circles. The upper right hand corner represents a dielectric layer 24 having a thickness of 5 mils (0.005"), whereas the lower right hand corner shows a dielectric layer 24 having a thickness of 10 mils (0.010"). Three examples for each of the various cross flow instability inhibiting assemblies 22 are shown representing three different levels of voltage being applied to the plurality of electrodes 38. FIG. 8 represents the fact that the plasmas 62 generated by the cross flow instability inhibiting assembly 22 is enhanced with increased voltage. It is also determined that the plasmas 62 may be created through different thicknesses of the dielectric by managing the voltage applied across the electrodes 38. As is shown in the right side of FIG. 8, the same plasmas 62 may be generated over a large range of thicknesses of the dielectric layer 24 by varying the voltage between the top and bottom surfaces. These example embodiments are merely illustrative and are not considered exhaustive.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A cross flow instability inhibiting assembly for generating a streamwise voracity with periodic spacing along the surface on a swept wing, said cross flow instability inhibiting assembly comprising:

a base of dielectric material having an inner surface and an outer surface;

a plurality of electrodes fixedly secured to said inner surface, said plurality of electrodes electrically connected to a source of electrical current;

a ground layer covering said outer surface of said dielectric layer, said ground layer defining a continuous uninterrupted outer surface and an interior surface;

a plurality of regions formed out of said interior surface of said ground layer maintaining said outer surface continuous and uninterrupted, wherein each of said plurality of regions is aligned with each of said plurality of electrodes and generates a plasma roughness area disposed adjacent each of said plurality of regions such that each of the plasma roughness areas prevents/inhibits cross flows instabilities across the swept wing.

2. A cross flow instability inhibiting assembly as set forth in claim 1 wherein said plurality of regions are etched out of said ground layer.

3. A cross flow instability inhibiting assembly as set forth in claim 1 wherein each of said plurality of regions defines a tube extending through said ground layer and terminating at said outer surface.

4. A cross flow inhibiting assembly as set forth in claim 3 wherein said tube defines at least one side wall.

5. A cross flow inhibiting assembly as set forth in claim 4 wherein said tube is filled with a dielectric material.

6. A cross flow instability inhibiting assembly as set forth in claim 5 wherein said at least one side wall is lined with a conducting material.

7. A cross flow instability inhibiting assembly as set forth in claim 6 wherein said conducting material is a metal.

8. A cross flow instability inhibiting assembly as set forth in claim 7 wherein each of said plurality of electrodes is electrically connected to other of said plurality of electrodes in series.

9. A cross flow instability inhibiting assembly as set forth in claim 8 wherein said plurality of electrodes are electrically connected to each other in multiple subsets such that each of said subsets includes a portion of said plurality of electrodes.

10. A cross flow instability inhibiting assembly as set forth in claim 9 wherein each of said multiple subsets is connected to electrical current independently of other of said multiple subsets.

11. A cross flow instability inhibiting assembly as set forth in claim 10 wherein the voltage potential is applied to the bottom electrodes and the top conductor is held at ground.

12. A cross flow instability inhibiting assembly as set forth in claim 11 wherein the voltage potential is applied to the top conductor and the bottom electrodes are held at ground.

13. A cross flow instability inhibiting assembly as set forth in claim 12 wherein a portion of the voltage potential is carried by the top conductor and a portion is carried by the bottom electrodes.

14. A cross flow instability inhibiting assembly as set forth in claim 9 including a plurality of layers of dielectric material wherein each of said multiple subsets of electrodes are separated from each other by each of the plurality of layers of dielectric material.

15. A cross flow instability inhibiting assembly as set forth in claim 14 including a plurality of conducting paths, each extending between each of said plurality of layers of dielectric material.

16. A cross flow instability inhibiting assembly as set forth in claim 1 wherein each of said plurality of regions is coaxial with each of said plurality of electrodes.

* * * * *